US007847863B2

(12) United States Patent
Ali

(10) Patent No.: US 7,847,863 B2
(45) Date of Patent: Dec. 7, 2010

(54) ENHANCING SHARPNESS IN VIDEO IMAGES

(75) Inventor: Walid Ali, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1580 days.

(21) Appl. No.: 11/149,813

(22) Filed: Jun. 10, 2005

(65) Prior Publication Data

US 2006/0279660 A1 Dec. 14, 2006

(51) Int. Cl.
*H04N 5/21* (2006.01)
*G06K 9/40* (2006.01)
(52) U.S. Cl. .................................. 348/625; 382/269
(58) Field of Classification Search ................ 348/625, 348/627, 630, 631, 607, 609, 606; 382/269, 382/254, 275; 704/203, 225, 234, 236
See application file for complete search history.

(56) References Cited

U.S. PATENT DOCUMENTS

| | | | |
|---|---|---|---|
| 5,920,357 A | | 7/1999 | Ohara et al. |
| 6,037,986 A | * | 3/2000 | Zhang et al. ........... 375/240.12 |
| 6,072,538 A | * | 6/2000 | Keating .................... 348/625 |
| 6,148,116 A | | 11/2000 | Park et al. |
| 6,476,876 B1 | * | 11/2002 | Matsunaga et al. ......... 348/625 |
| 6,600,518 B1 | * | 7/2003 | Bakhmutsky et al. ....... 348/625 |
| 2004/0207881 A1 | | 10/2004 | Nomura |
| 2006/0251170 A1 | * | 11/2006 | Ali ........................ 375/240.16 |
| 2006/0285766 A1 | * | 12/2006 | Ali ............................. 382/263 |
| 2006/0285767 A1 | * | 12/2006 | Ali ............................. 382/265 |
| 2007/0019880 A1 | * | 1/2007 | Ali et al. .................... 382/263 |

FOREIGN PATENT DOCUMENTS

CN 1411657 4/2003

OTHER PUBLICATIONS

PCT/US2006/022199, ISR, Sep. 27, 2006.
PCT/US06/022199, Written Opinion, Sep. 27, 2006.
PCT/US06/022199, International Search Report, Sep. 27, 2006.
A. Murat Tekalp et al., "Identification of Image & Blur Parameters for the restoration of Noncausal Blurs" IEEE Transactions on Acoustics, Speech and Signal Processing vol. 34,No. 4,Aug. 1986, pp. 963-972.
Sung Cheol Park et al., "Super resolution image reconstruction: a technical overview" IEEE Signal Processing Magazine, vol. 20, No. 3, May 2003, pp. 21-36.
Gerald Dehaan et al., "Video processing for multimedia systems", ISBN 9090140158, May 2000, pp. 106-109.
Chinese Patent Office, 1st Office Action for corresponding Chinese Application No. 20610091311.9, 15 pgs., Apr. 11, 2008.

* cited by examiner

*Primary Examiner*—Paulos M Natnael
(74) *Attorney, Agent, or Firm*—Trop, Pruner & Hu, P.C.

(57) ABSTRACT

A method of selectively sharpening video data may include, for at least some pixels in the video data, generating a sharpened value for a pixel value in an image. The sharpened value may be disregarded if a combination of the pixel value and the sharpened value is in a coring region. The sharpened value also may be disregarded if a combination of the pixel value and the sharpened value is a clipping region. The combination of the pixel value and the sharpened value may be output if the combination is not in the coring region or in the clipping region.

19 Claims, 6 Drawing Sheets

$$\begin{pmatrix} -1 & 0 & -2 & 0 & -1 \\ 0 & 0 & 0 & 0 & 0 \\ -2 & 0 & 12 & 0 & -2 \\ 0 & 0 & 0 & 0 & 0 \\ -1 & 0 & -2 & 0 & -1 \end{pmatrix} \Big\} 410$$

Fig. 4

ENHANCING SHARPNESS IN VIDEO IMAGES

CROSS-REFERENCE TO RELATED APPLICATIONS

The present application is related to application Ser. No. 11/121,483, entitled "Varying Sharpness Based On Motion In Video Sequences" and filed May 4, 2005, the content of which is hereby incorporated by reference, and to application Ser. No. 11/184,688, entitled "Enhancing Video Sequence Sharpness By Adaptive Peaking" filed Jul. 19, 2005.

BACKGROUND

Implementations of the claimed invention generally may relate to schemes for enhancing video information and, more particularly, to such schemes that alter the sharpness of the video information.

Video information may be transmitted via a medium in time and/or space for viewing at a separate time and/or location. In some cases, the medium may be a transmission medium, such as carrier waves (e.g., terrestrial and/or cable-carried) or protocol-based data networks. In some cases, the medium may be a storage medium (e.g., tape, hard disk, digital video disc (DVD), etc.) that may store the video information prior to its display. Typically, the video data may be encoded into one of a number of formats before transmission. Some encoding formats may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

Such encoding of video information may remove (e.g., by quantizing, etc.) some higher-frequency content in the original video information. The decoded information may appear smoothed and/or somewhat fuzzy when displayed. This phenomenon may not be unique to encoded video data, but may also be present in, for example, transmitted analog video due to impediments in the transmission path. Thus, it may be desirable to increase the sharpness of received and/or decoded video data to improve its perceived picture quality.

To further introduce the concept of sharpening video, a one-dimensional example will be discussed with regard to FIGS. 1A and 1B. An image in a video sequence may include, for example, luma and chroma signals (e.g., Y, U, and V) sampled in both the horizontal and vertical directions. When the image is roughly uniform in a certain area, the sample values may be substantially the same. When an edge (e.g. a horizontal edge) exists in the image, however, the sample values in the horizontal direction may undergo an abrupt change in value. FIG. 1A illustrates a one-dimensional plot 110 of luma values that change somewhat abruptly over a number of pixels.

To sharpen the video signal, overshoots/undershoots may be generated in the signal (e.g., Y, U or V) by adding the second derivative (e.g., $d^2Y/dx^2$) of plot 110 to itself. FIG. 1B illustrates a plot 120 that has been so sharpened by the addition of undershoot 130 and overshoot 140. Adding overshoot/undershoot 140/130 may boost perceived, higher frequency components. Because plot 120 may have steeper edges than plot 110, its transition may be perceived as visually sharper than that of unsharpened plot 110.

Some schemes for increasing the sharpness of video information, however, may also increase noise within the video information to unacceptable levels.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIGS. 1A and 1B conceptually illustrate sharpening a video signal;

FIG. 4 conceptually illustrates an example convolution kernel;

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1A:
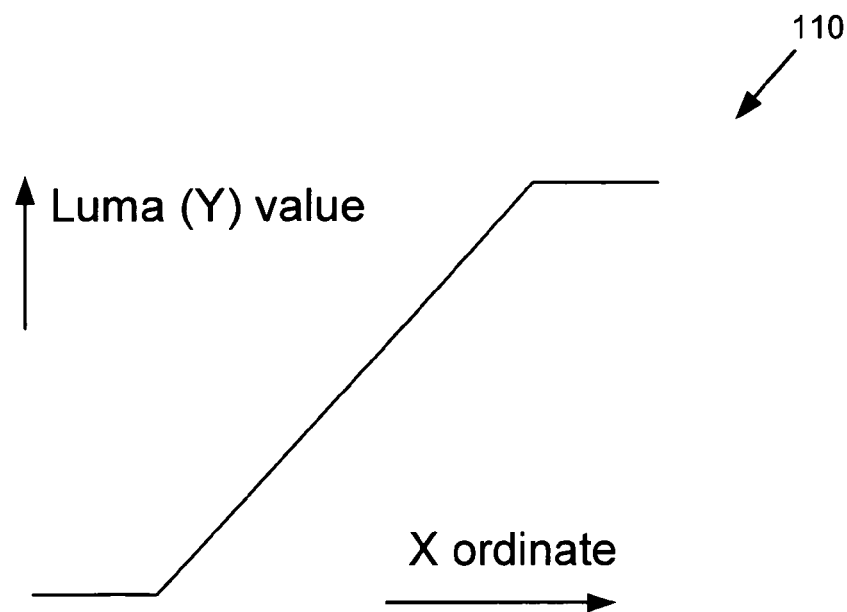
Figure 1B:
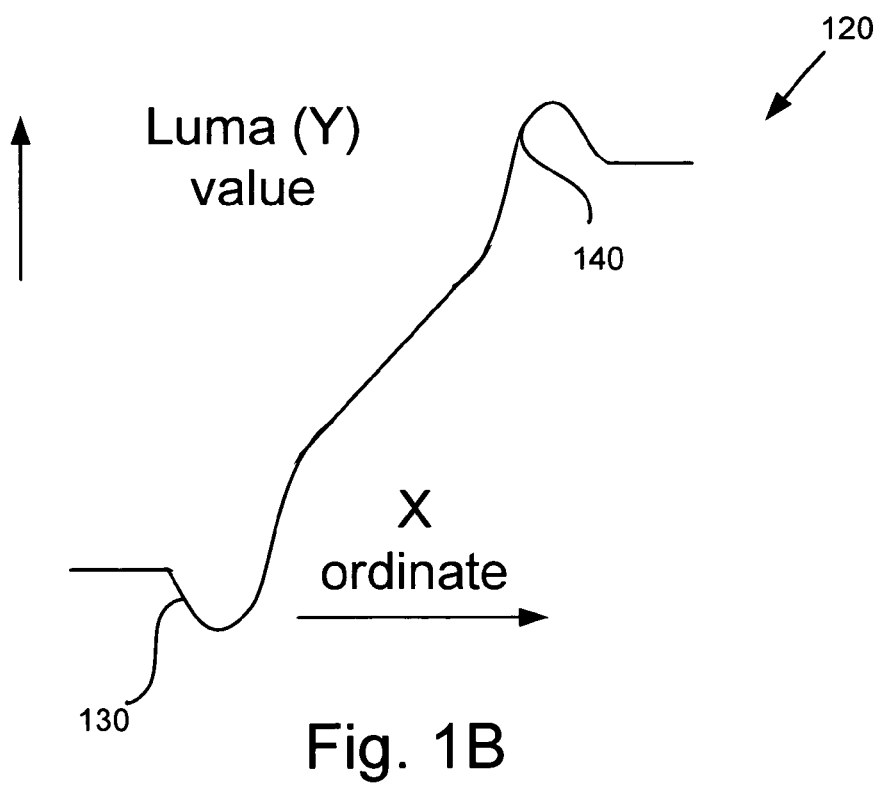
Figure 2:
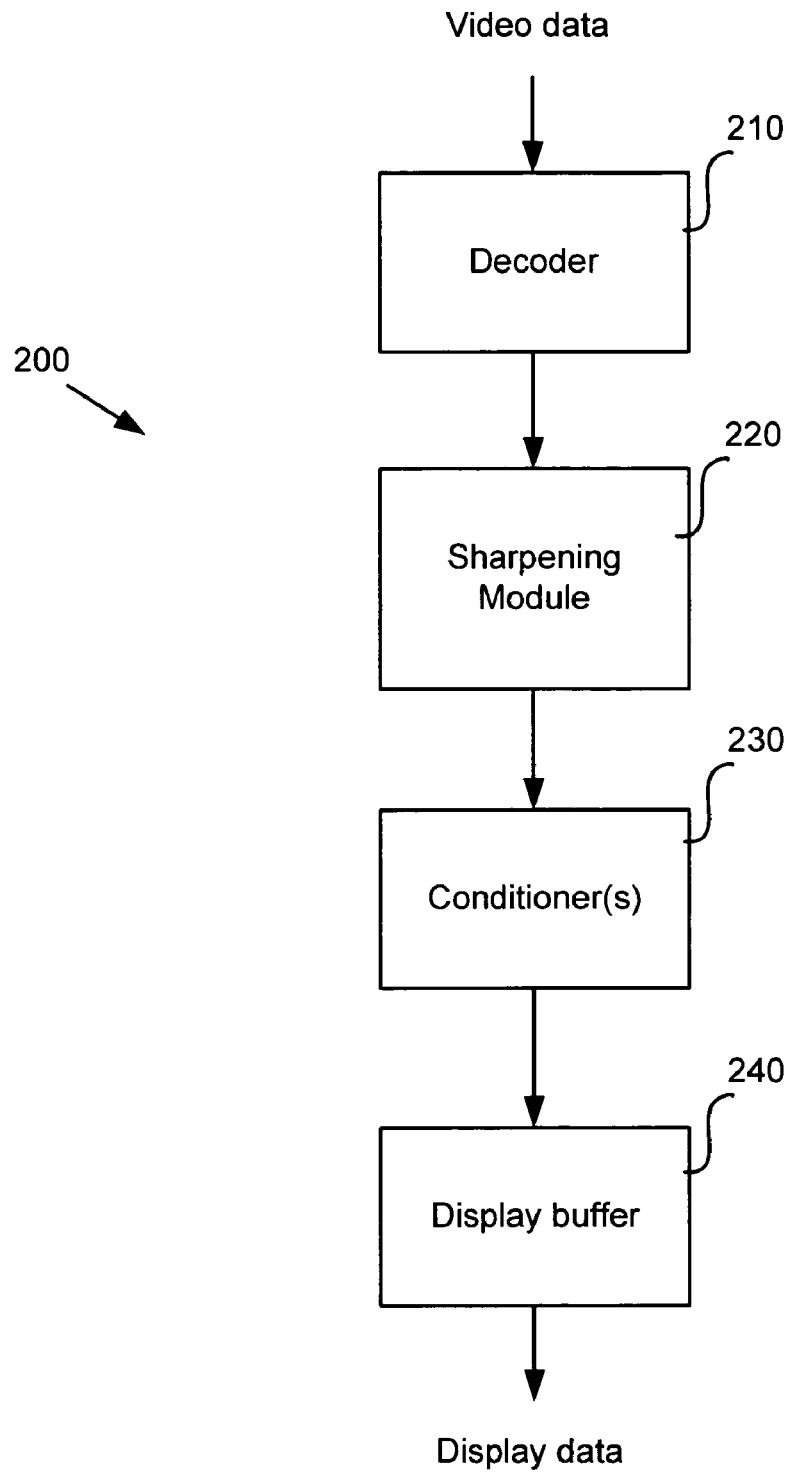
FIG. 2 illustrates a portion of a video display system.

FIG. 2 illustrates a portion of a video display system 200. System 200 may receive video information from any suitable medium, including but not limited to various transmission and/or storage media. Although illustrated as separate functional elements for ease of explanation, any or all of the elements of system 200 may be co-located and/or implemented by a common group of gates and/or transistors. Further, system 200 may be implemented via software, firmware, hardware, or any suitable combination thereof.

The portion of display system 200 shown in FIG. 2 may include a decoder 210, a sharpening module 220, one or more signal conditioner(s) 230, and a display buffer 240. Decoder 210 may, in some implementations, decode encoded video data to produce a stream of video data for further processing. Decoder 210 may decode data encoded in a number of schemes that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

In some implementations, decoder 210 may include a demodulator, for example for received analog video. Such a demodulator may perform a similar function to a digital decoder by extracting a stream of video from a received, modulated signal. In other implementations, decoder 210 may include any other such circuitry and functionality desirable to extract a stream of video pixels that is usable by sharpening module.

Sharpening module 220 may function to selectively sharpen the stream of video from decoder 220. In some implementations, sharpening module 220 may differently sharpen certain portions of a picture in the video stream based on their amplitudes and/or their neighboring pixels.

Figure 3:
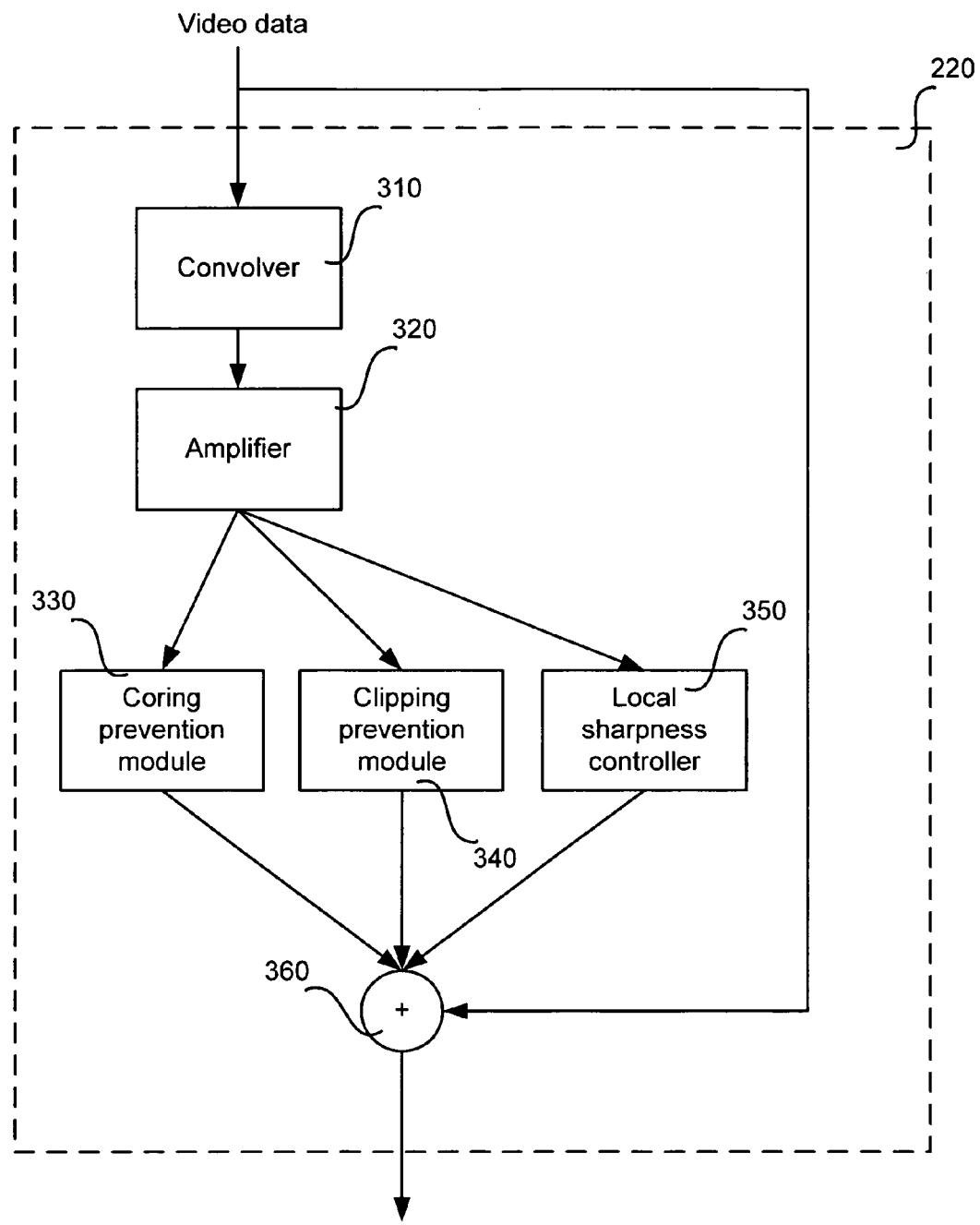
FIG. 3 illustrates an exemplary sharpening module in the system of FIG. 2.

FIG. 3 illustrates an implementation of sharpening module 220. Sharpening module 220 may include a convolver 310, an amplifier 320, a coring prevention module 330, a clipping prevention module 340, a local sharpness controller 350, and a combiner 360. Although illustrated as being connected in a certain manner for ease of illustration, sharpening module 220 in FIG. 3 may be connected in other configurations. For example, elements 330-350 may be connected serially, instead of in parallel as shown. Also, in some implementations, combiner 350 may be located before elements 330-350, instead of after as shown. Other variations are both possible and contemplated.

Convolver 310 may be arranged to sharpen a pixel (e.g., Y, U, and/or V component) of video data by adding content to the pixel. Convolver 310 may convolve a two-dimensional (2D) Laplacian kernel with a number of pixels surrounding the pixel in question to obtain a derivative value. Such derivative value, the output of convolver 310, may be referred to as a sharpened pixel value.

For example, in some implementations, convolver 310 may use a 5×5 kernel, such as Laplacian convolution kernel 410 shown in FIG. 4. Convolver 310 may convolve kernel 410 with, for example, the 5×5 luma data containing the pixel in question to obtain the 2D derivative of the luma signal. The output of convolver 310 may be, for example, a 7×7 array as a result of convolution of the 5×5 luma (or chroma) data with the 5×5 kernel. The sharpened pixel value output by convolver 310 may be the center value of such resulting array that corresponds to the pixel in question.

Other variations than this specific example are contemplated. For example, a different-sized kernel may be used by convolver 310. In some implementations, the same or different kernels may be used for luma (e.g., Y) and chroma (e.g., U and/or V) video data. In some implementations, only the luma data may be convolved, while passing the chroma data unaltered.

Amplifier 320 may be arranged to increase the sharpened pixel value from convolver 310. In some implementations, amplifier 320 may amplify the sharpened pixel values by an amount around 15% of the energy of kernel 410 to produce an amplified pixel value. Other gain values are possible for amplifier 320, however. In some implementations, amplifier 320 may only supply gain to those pixel values that exceed around 5% (or another relatively small threshold) of the overall dynamic range of the sharpened pixel values. Such selective amplification by amplifier 320 may avoid amplifying noise below a certain signal level. Amplifier 320 may output amplified pixel values to one or more of elements 330-350.

Because amplifier 320 may output derivative, sharpening values, and because combiner 360 may add the original pixel values back in, elements 330-350 may be conceptualized as selectively preventing or permitting the addition of the amplified pixel values by combiner 360. As will be explained in greater detail below, under certain conditions elements 330-350 may prevent the addition of values from amplifier 320 (e.g., causing video data to be output from combiner 360 without sharpening). Under other conditions elements 330-350 may permit sharpening of video pixels at combiner 360. As will be explained further, in some implementations elements 330-350 may operate somewhat exclusively. That is, for a given amplitude range of the input video data, only one of elements 330-350 may operate to prevent amplified data from amplifier 320 from reaching combiner 360.

Coring prevention module 330 may be arranged to prevent "coring" due to the presence of image noise. Such noise may produce a relatively small value at, for example, the output of convolver 310 that may be apparent in the enhanced pixel value from combiner 360. Coring prevention module 330 may act to reduce and/or eliminate certain small input values. Purely by way of example, if the amplified pixel value is less than some threshold of about ±10 (e.g., out of a full-scale range of about ±250), then coring prevention module 330 may set the amplified pixel value to 0. For amplified pixel values that fall outside this small range, coring prevention module 330 may subtract this threshold from the values.

Figure 5A:
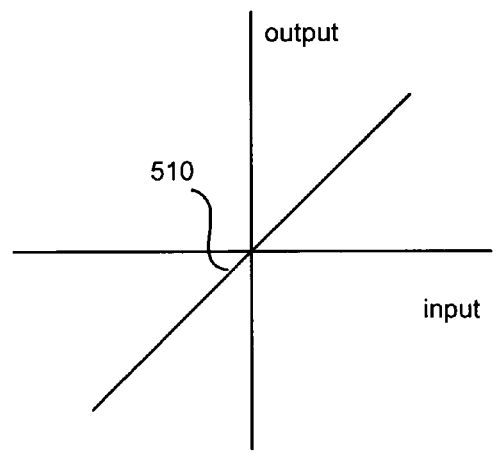
FIGS. 5A-5C illustrate exemplary transfer functions.
Figure 5B:
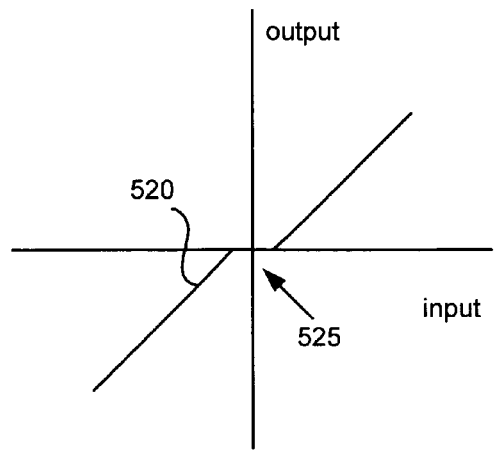

The operation of coring prevention module 330 will be further described with regard to FIGS. 5A and 5B. As a starting point of reference, plot 510 in FIG. 5A represents a transfer function without module 330 present. In other words, plot 510 may be conceptualized as a transfer function of unity. The output mirrors the input in plot 510. By contrast, plot 520 in FIG. 5B represents a transfer function with module 330 present. As may be seen in FIG. 5B at 525, when the input to module 330 from amplifier 320 is less than a certain threshold value, module 330 may cause combiner 360 to output zero. For example, for values in range 525 (e.g., below a threshold coring value) coring prevention module 330 may output the inverse of the pixel data that is the other input to combiner 360, causing combiner 360 to output zero. Otherwise, module 330 may pass the input, amplified pixel value minus the threshold value.

Although module 330 (and associated plot 520 in FIG. 5B) has been described as operating based on the amplified derivative output of amplifier 320, in some implementations module 330 may operate based on the video data (e.g., pre-sharpened values) input to convolver 310. In some implementations, module 330 may operate based on the combination of the pre-sharpened pixel data and the amplified derivative output of amplifier 320. Regardless of which data module 330 operates based upon (and which associated threshold value at 525 in FIG. 5B), it may operate in all cases to prevent coring in the sharpened pixel values output by combiner 360. Similar caveats apply to elements 340 and 350. In some implementations, they may operate based on the derivative value from amplifier 320, the original unsharpened pixel data, or both.

Returning to FIG. 3, clipping prevention module 340 may be arranged to prevent "clipping" due to high levels of output. Such high levels may produce Moire (e.g., aliasing) effects in the final, viewed video signal. Clipping prevention module 340 may act to limit certain large input values to a ceiling value. Purely by way of example, if the amplified pixel value input to clipping prevention module 340 is greater than a clipping threshold, then clipping prevention module 340 may limit the amplified pixel value to a ceiling value. For amplified pixel values that fall outside this higher range, clipping prevention module 340 may pass them substantially unaltered.

Figure 5C:
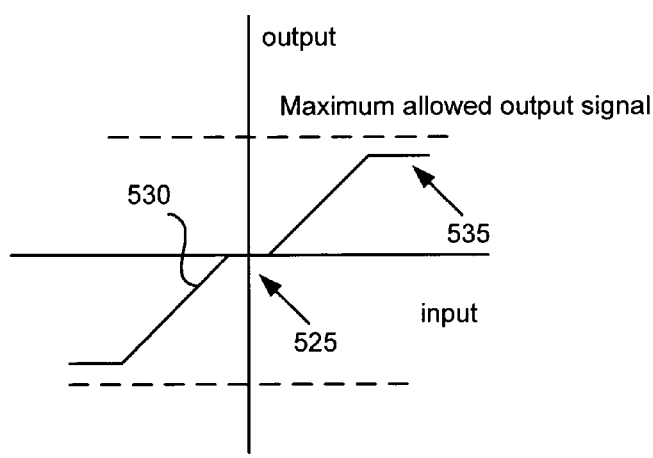

The operation of clipping prevention module 340 will be further described with regard to FIGS. 5B and 5C. Plot 530 in FIG. 5C represents a transfer function with modules 330 and 340 present. In addition to the effect 525 of module 330, when the input to clipping prevention module 340 is greater than a certain ceiling value 535, module 340 may limit the output of combiner 360 to ceiling value 535. In some implementations, clipping prevention module 340 may not pass the output of amplifier 320 to combiner 360 in order to limit the output of combiner 360 to ceiling value 535. Ceiling value 535 may approach, but may be less than, a maximum allowed output value (illustrated as a dashed line) to avoid clipping. For smaller input values, clipping prevention module 340 may pass the input, amplified pixel value without alteration.

Returning to FIG. 3, local sharpness controller 350 may be arranged to disable sharpening (e.g., not pass the output of amplifier 320 to combiner 360) if the area around the pixel in question is generally smooth. Various implementations are possible for this local control function. For example, although not explicitly shown in FIG. 3, controller 350 may be connected to one or more of convolver 310 and amplifier 320 to disable their operation if surrounding pixels vary less than a certain amount from the pixel in question (e.g., the surrounding pixels are generally "smooth" with regard to the pixel in question).

In some implementations, sharpness controller 350 may use an average value of the array output by convolver 310 as a measure of "smoothness" around the pixel in question. In other implementations, less than the entire array output by convolver 310 may be used as the measure of "smoothness" around the pixel in question. Other implementations are both possible and contemplated. If local sharpness controller 350 determines that the pixels surrounding the pixel in question are generally smooth, it may not pass the amplified pixel value from amplifier 320 to combiner 360. In such cases (e.g., where the video data is smooth and outside the effective ranges of modules 330 and 340), the unaltered video data may be output from combiner 360. Otherwise, local sharpness controller 350 may pass the amplified pixel value from amplifier 320 to combiner 360.

Combiner 360 may combine the amplified pixel values from amplifier 320 with any output values from modules 330-350 to output sharpened pixel values. In some implementations, combiner 360 may include an adder to add an amplified pixel value from modules 330-350 to a corresponding unsharpened pixel value. In some implementations, combiner 360 may include other logic to arithmetically (e.g., subtracter, multiplier, etc.) and/or logically (e.g., AND, XOR, etc.) combine an amplified pixel values to a corresponding enhancement value as appropriate.

Although elements 330-350 may all be present in some implementations, in other implementations these elements may be optional, either singly or in pairs.

Returning to FIG. 2, sharpening module 220 may output enhanced pixel values to one or more conditioner(s) 230 that may further condition the pixels. Conditioner(s) 230 may include, for example, one or more of deinterlacing, noise reduction, scaling, and/or other signal conditioning functionality. Conditioner(s) 230 may be implemented via dedicated hardware, firmware, software, or some combination thereof to perform one or more signal conditioning functions after the sharpening performed by sharpening module 220.

Display buffer 240 may receive video data from conditioner(s) 230, and may temporarily store at least some of such data prior to its output to a display device (not shown). In addition to a buffering (e.g., storage) function, display buffer 240 may perform other display-related tasks, such as synchronizing its output signal to a timing or sync signal to facilitate display. Other functionality that is typically found in display buffers may also be present in display buffer 240.

Figure 6:
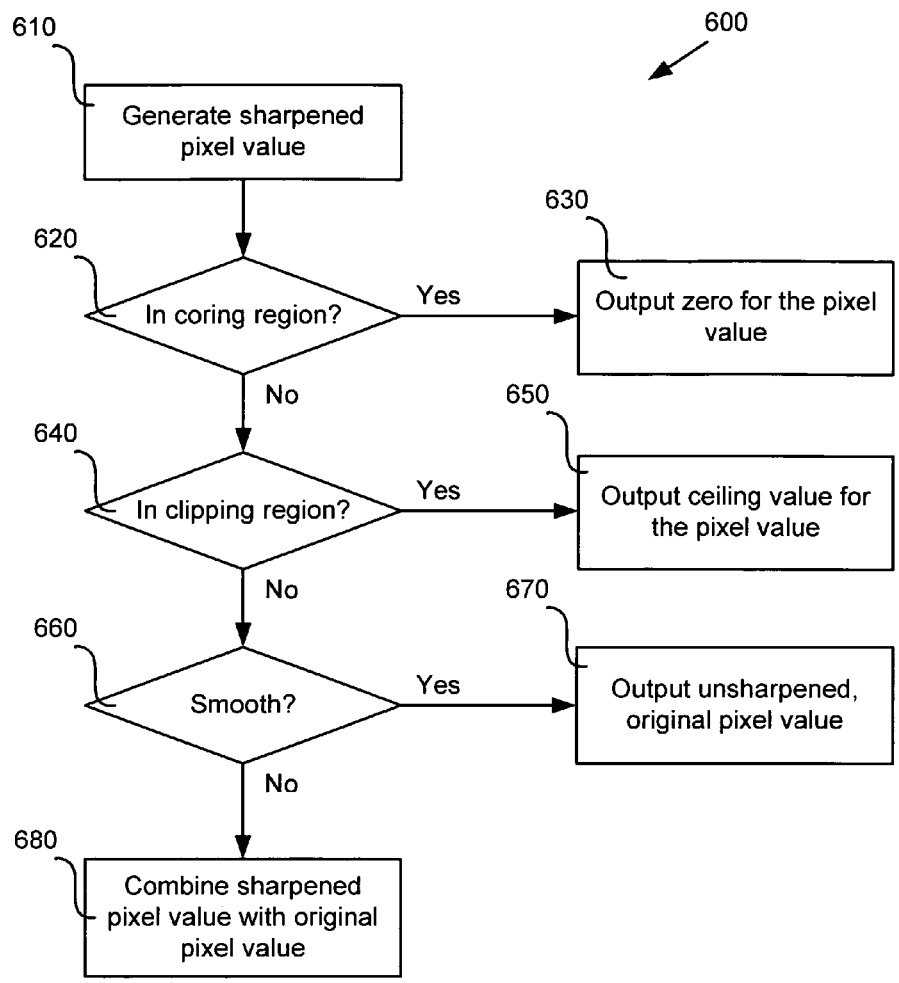
FIG. 6 illustrates an exemplary process of selectively changing the sharpness of video data.

FIG. 6 illustrates an example process 600 of selectively changing the sharpness of video data. Although FIG. 6 may be described with regard to sharpening module 220 in FIGS. 2 and 3 for ease and clarity of explanation, it should be understood that process 600 may be performed by other hardware and/or software implementations.

Processing may begin by generating a sharpened pixel value [act 610]. The sharpened pixel value may be generated, as previously described, by convolver 310 and, optionally, amplifier 320.

Processing may continue with coring prevention module 330 determining whether the sharpened pixel output by combiner 360 will be within coring region 525 [act 620]. If so,
coring prevention module 330 may cause combiner 360 to output a zero value for the pixel [act 630]. Such output may be visualized in region 525 in FIG. 5B. If coring prevention module 330 determines in act 620 that the sharpened pixel output by combiner 360 will fall outside region 525, processing may proceed (e.g., possibly via other modules 340 and 350).

Clipping prevention module 340 may determining whether the sharpened pixel output by combiner 360 will be above ceiling value 535 in FIG. 5C, within a clipping region [act 640]. If so, clipping prevention module 340 may cause combiner 360 to output ceiling value 535 for the pixel [act 650]. Such output may be visualized in FIG. 5C. If clipping prevention module 340 determines in act 640 that the sharpened pixel output by combiner 360 will fall below ceiling value 535, processing may proceed (e.g., possibly via module 350 or combiner 360).

Local sharpness controller 350 may determining whether pixels around the pixel in question meet a smoothness criteria [act 660]. As previously described, local sharpness controller 350 may use the array (e.g., an average value calculated therefrom) output by convolver 310 to determine whether the surrounding pixels are sufficiently smooth. If so, local sharpness controller 350 may prevent the amplified pixel value that is output by amplifier 320 from reaching combiner 360. In such a case, combiner 360 may output the unsharpened, original pixel value that is the input to convolver 310 [act 670].

If local sharpness controller 350 determines in act 660 that the surrounding pixels are not sufficiently smooth, it may pass the amplified pixel value that is output by amplifier 320 to combiner 360. As a result, combiner 360 may combine the amplified pixel value that is output by amplifier 320 with the original pixel value that is the input to convolver 310 [act 690]. Hence, as may be observed from FIG. 6, a given pixel value may be sharpened unless the resulting, sharpened pixel value would be in a coring region, in a clipping region, or surrounded by generally smooth pixels. If any of these three conditions apply, modified pixel values may be produced, as described in acts 630, 650, and 670.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although modules 330-350 have been described as being present and usable together, in some implementations only one or two of modules 330-350 may be present. For example, in some implementations, only modules 330 and 340 may be present. In some implementations, only modules 330 and 350 or only modules 340 and 350 may be present. Further, in some implementations only one of modules 330-350 may be singly present.

Also, although the scheme described herein may be performed on a pixel-by-pixel basis, it may also be performed for aggregations or groups of pixels in an image.

Further, the acts in FIG. 6 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A method, comprising:
generating a sharpened value for a pixel value in an image;
outputting the pixel value without the sharpened value if a combination of the pixel value and the sharpened value is in a coring region or in a clipping region; and
outputting the combination of the pixel value and the sharpened value if the combination is not in the coring region or in the clipping region.

2. The method of claim 1, wherein the generating includes:
convolving the pixel value and a number of surrounding pixels with a kernel to produce a sharpened pixel array.

3. The method of claim 2, wherein the generating further includes:
amplifying a value in the sharpened pixel array to produce the sharpened value.

4. The method of claim 1, wherein the disregarding includes:
outputting a zero value if the combination of the pixel value and the sharpened value is in the coring region.

5. The method of claim 1, wherein the disregarding includes:
outputting a ceiling value if the combination of the pixel value and the sharpened value is in the clipping region.

6. The method of claim 1, wherein the disregarding includes:
outputting the pixel value if a number of pixels surrounding the pixel value are sufficiently smooth.

7. A method, comprising:
generating an enhancement value for use in producing an output pixel value from an input pixel value in an image;
outputting a zero value as the output pixel value if a combination of the enhancement value and the input pixel value is below a coring threshold; and
outputting the input pixel value as the output pixel value if a measure based on the input pixel and a number of surrounding pixels indicates smoothness.

8. The method of claim 7, further comprising:
outputting the combination of the enhancement value and the input pixel as the output pixel value if the combination of the enhancement value and the input pixel value falls above the coring threshold and if the measure based on the input pixel and a number of surrounding pixels falls does not indicate smoothness.

9. The method of claim 7, further comprising:
outputting a ceiling value as the output pixel value if a combination of the enhancement value and the input pixel value falls above a clipping threshold.

10. The method of claim 9, further comprising:
outputting the combination of the enhancement value and the input pixel as the output pixel value if the combination of the enhancement value and the input pixel value falls above the coring threshold and below the clipping threshold and if the measure based on the input pixel and a number of surrounding pixels falls does not indicate smoothness.

11. The method of claim 7, wherein the generating includes:
convolving the input pixel value and a number of surrounding pixels with a kernel array.

12. A system, comprising:
a sharpening portion to sharpen a pixel of video data and output a sharpened pixel value;
a combiner to selectively combine the sharpened pixel value and the pixel of video data and to output an enhanced pixel value; and
a module portion coupled between the sharpening portion and the combiner to prevent coring or clipping in the enhanced pixel value output by the combiner by preventing the sharpened pixel value from being output if the sharpened pixel value is in a coring or clipping region.

13. The system of claim 12, wherein the sharpening portion includes:
a convolver to convolve the pixel and a number of surrounding pixels with a similarly sized kernel.

14. The system of claim 13, wherein the sharpening portion further includes:
an amplifier to amplify an output of the convolver to generate the sharpened pixel value.

15. The system of claim 12, wherein the module portion includes:
a coring prevention module to cause enhanced pixel values that would be less than a coring threshold to be zero.

16. The system of claim 12, wherein the module portion includes:
a clipping prevention module to limit enhanced pixel values that would be greater than a clipping threshold to a value of the clipping threshold.

17. The system of claim 12, wherein the module portion includes:
a local sharpness controller to cause the enhanced pixel value to be the same as the pixel of video data when an area of pixels around the pixel of video data is substantially smooth.

18. The system of claim 12, further comprising:
a deinterlacing module, a noise reduction module, or a sealing module operatively coupled to an output of the combiner to further condition the enhanced pixel value.

19. The system of claim 12, further comprising:
a display buffer operatively coupled to an output of the combiner to buffer enhanced pixel values before display.

* * * * *

UNITED STATES PATENT AND TRADEMARK OFFICE
CERTIFICATE OF CORRECTION

| | | |
|---|---|---|
| PATENT NO. | : 7,847,863 B2 | Page 1 of 1 |
| APPLICATION NO. | : 11/149813 | |
| DATED | : December 7, 2010 | |
| INVENTOR(S) | : Walid Ali | |

It is certified that error appears in the above-identified patent and that said Letters Patent is hereby corrected as shown below:

Column 8:
Line 49, "sealing" should be --scaling--.

Signed and Sealed this
Nineteenth Day of April, 2011

David J. Kappos
*Director of the United States Patent and Trademark Office*